Figure 3:
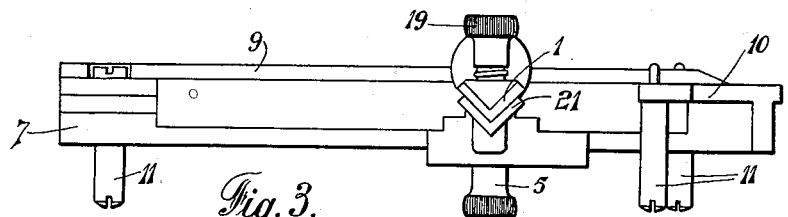

Feb. 26, 1935. L. H. HOUNSFIELD 1,992,573
INSTRUMENT OR GAUGE FOR MEASURING RELATIVE
LENGTHS OR VARIATIONS IN LENGTHS
Filed Oct. 17, 1933

INVENTOR.
L. H. HOUNSFIELD.
By Blair & Kilcoyne
ATTYS.

Patented Feb. 26, 1935

1,992,573

UNITED STATES PATENT OFFICE 1,992,573

INSTRUMENT OR GAUGE FOR MEASURING RELATIVE LENGTHS OR VARIATIONS IN LENGTHS

Leslie Haywood Hounsfield, Wimbledon, London, England

Application October 17, 1933, Serial No. 693,970
In Great Britain January 30, 1933

9 Claims. (Cl. 33—147)

The present invention relates to instruments or gauges for measuring relative lengths or variations in lengths and more particularly to instruments or gauges for measuring the relative or percentage elongation or contraction produced in metal or other test pieces resulting from their having been broken or elongated or contracted in tensile or crushing testing machines.

It is an object of the present invention to provide an instrument or gauge for measuring the relative or percentage variation in the gauge lengths of test pieces of varying gauge lengths.

It is a further object of the invention to provide an instrument or gauge for measuring the relative or percentage variation of gauge length by means of the elongation of the whole test piece.

For the purpose of this specification the "gauge length" of a test piece means that part of a test piece the elongation or contraction of which is required. Thus for example in the case of tensile test pieces, it means the length of the reduced parallel portion between the customary radii or fillets which connect the parallel portion to the enlarged heads or shoulders. In the case of a test piece for a compression test the gauge length will in general be equal to the whole length of the test piece.

A further object of the invention is to provide an instrument or gauge in which the relative or percentage variation in length of a test piece is determined by the angular movement of a pointer which is displaced in accordance with the variation in gauge length, the distance of the point of application of the displacement from the fulcrum of the pointer being adjusted in accordance with the length of the gauge length of the test piece.

With these and other objects in view the invention comprises an instrument or gauge for measuring relative or percentage variations in the gauge length of test pieces and includes a pair of movable abutments for engaging the ends of a test piece, supporting and guiding means for supporting and guiding the abutments for independent movement towards and away from each other, a pivoted index lever, a support for said index lever, connected to said supporting and guiding means in such manner that the distance of the latter from the pivot of the index lever can be varied, a scale over which the index lever moves, carried by said support, means for locking one of said abutments relatively to said supporting and guiding means and means for transmitting movements of the other abutment to said index lever.

In a preferred form of invention the instrument comprises:—

A cradle or trough or other suitable receptacle for carrying the test piece before and after test.

A graduated slide, extending and movable at right angles to the trough, which it carries by means of one of the known forms of saddle.

An indicating lever carried by the slide and pivoted at one end while the other end can travel over a graduated arc.

For convenience of description these three parts will be referred to subsequently as the trough, the slide and the lever.

The disposition of the lever is such that any increase in length of the test-piece lying in the trough results in a change of angular position of the lever with regard to the graduated arc.

For any particular elongation, the angular movement of the lever will be greater the closer the test-piece carrying trough is to the fulcrum of the lever hence the position of the trough relative to the slide must be adjusted so that the reading on the arc may be correct.

The correct position is obtained by adjusting the trough with regard to the slide till a graduation on the latter, corresponding to the gauge length of the particular test-piece being used, coincides with an index mark or arrow on the saddle.

The readings of the graduated arc indicate the ratio between the elongation of the test-piece and its original gauge length, and the graduated arc is preferably divided so that the readings give direct elongation and/or contraction per cent, without any calculation. The exact construction of the apparatus can of course be varied but the following description applies to some details of a convenient form.

The trough carries two sliding abutments capable of movement in the direction of its length. One abutment is so constructed that it slides with substantially constant though slight friction and it carries a pin and spring which cause the movements of this abutment and the lever to be mutual, i. e., each can move the other, but neither can move without the other. This one is termed the lever abutment.

The frictional resistance to sliding of the other abutment can be varied, by means of a screw acting on a spring, from nothing to that sufficient to lock the abutment in position. This second abutment is termed the screwed abutment.

The method of use is as follows:—

The index mark on the saddle portion of the trough is set to the mark on the slide corresponding to the gauge length of the particular test-piece being examined and the saddle is then locked in this position.

The unstressed test-piece is laid in the trough between the abutments, the screwed abutment is slackened and moved towards the test-piece till the test-piece first touches and then moves the lever abutment and with it the lever till the reading on the graduated arc is something above zero.

The lever is then moved carefully by hand back to zero which movement is transmitted to both abutments and test-piece which are all three in light contact with one another.

The screwed abutment is now locked, the test-piece removed and "pulled" (in the case of tensile testing) in a tensile testing machine, the lever is moved over the arc so as to increase the distance between the abutments, the broken pieces or the elongated unbroken test-piece is replaced in the trough with the broken ends "fitted" if actually broken, and again the lever is moved carefully towards the zero until the lever abutment bears against the end of the test-piece.

As however the test piece has stretched or elongated the lever will not return to zero and when the lever abutment closes against the test-piece the elongation per cent of the gauge length is indicated by the lever on the scale or graduated arc.

Figure 2:
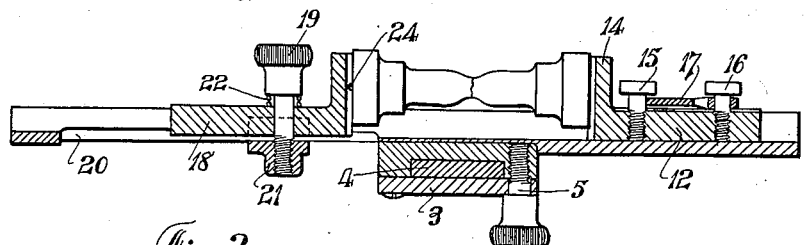
Figure 1:
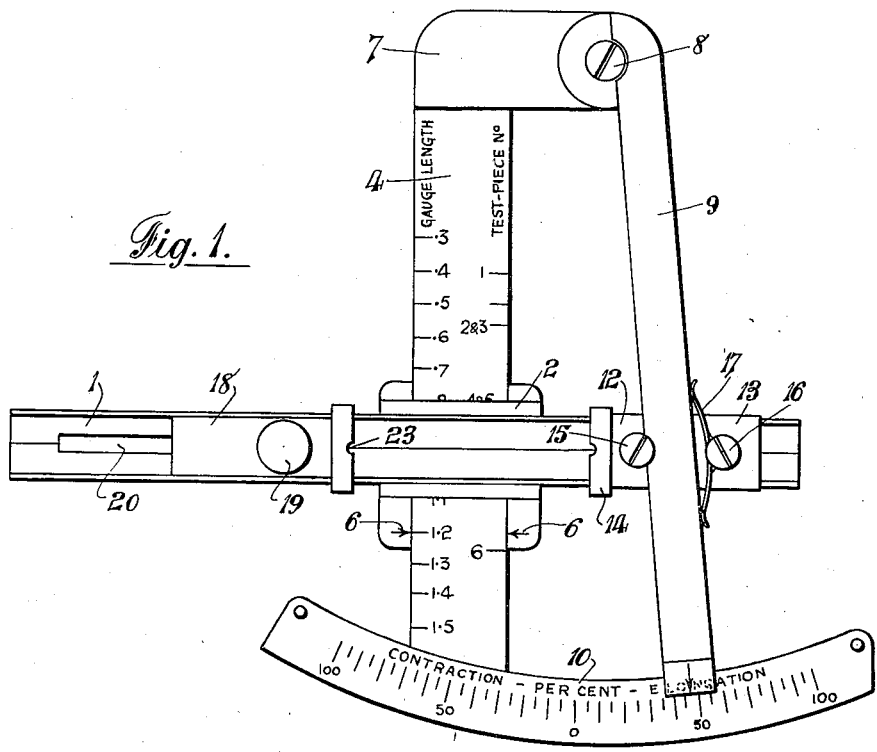

Referring to the accompanying drawing Fig. 1 represents by way of example, in plan one construction of the complete instrument. Fig. 2 shows in projection with Fig. 1, a section taken through the centre of the trough and in addition shows a broken test-piece in position for measurement.

Fig. 3 shows an end elevation of the instrument as seen from the left. In this description the same reference numerals are used in all figures.

A trough 1 is constructed of V section material, secured to a saddle 2, which has a cover plate 3, capable of gripping the saddle to a slide 4 when a screw 5 is tightened.

The slide is graduated on the left, to correspond with the gauge length measured in inches, and with numbers on the right which correspond to the numbers given to test-pieces which have been standardized in connection with a known form of tensile testing machine.

The saddle carries two index arrows 6 to enable the saddle to be set to its correct position with regard to the graduations.

Fixed to the slide are two extensions, the one 7 carries the fulcrum 8 of the lever 9 while the other extension 10 has a scale marked thereon graduated from 0 to 100 in both directions for measuring percentage elongation and contraction. The whole is carried on three legs 11.

A lever abutment 12 is frictionally held to the V trough by means of a thin plate 13 which extends over and exerts pressure on the outside walls of the trough. This abutment carries a vertical portion 14 against which the head of the test piece can bear, and a pin 15 which bears on the lever and causes the lever to move with the abutment. It will be seen that that edge of the lever 9 which contacts with the pin 15 is offset from the pivot point of the lever by an amount equal to the radius of the pin 15. Another pin 16 screwed to this abutment carries a swivelling spring 17 which keeps the lever in contact with the pin 15. The other or screwed abutment 18 is similar in form but has a screw 19 which passes through a hole in the abutment and through a slot 20 in the trough into a nut 21 which is so shaped as to press on the outside V walls of the trough. A spring 22 under the head of the screw 19 enables the sliding friction to be readily adjustable.

The vertical portion of each abutment has a slot 23 which provides a clearance for the "centre pip" 24 usually left by the turner on one end of a test-piece.

It may be remarked that the divisions on the graduated arc are not equal but are determined by projection from equal divisions on a straight line at right angles to the slide 4.

Whilst in the foregoing I have described a preferred embodiment of my invention it is to be understood that various modifications may be made without departing from the scope thereof. Thus for example while in the embodiment illustrated, the cradle or trough serves to support and guide the abutments and also for carrying the test piece, any other suitable means may be provided.

I claim:

1. An instrument or gauge for measuring relative or percentage variations in the gauge lengths of test pieces comprising a pair of movable abutments for engaging the ends of a test piece, supporting and guiding means for supporting and guiding the abutments for independent movement in the same straight line, a pivoted index lever, a support for said index lever connected to said supporting and guiding means in such manner as to permit of relative movement between these parts, a scale over which said index lever moves and carried by said support, means for locking one of said abutments relatively to said supporting and guiding means and means for transmitting movements of the other abutment to said index lever.

2. An instrument or gauge for measuring relative or percentage variations in the gauge lengths of test pieces comprising a pair of movable abutments for engaging the ends of a test piece, supporting and guiding means for supporting and guiding the abutments for independent movement in the same straight line, a pivoted index lever, a support for said index lever connected to said supporting and guiding means in such manner as to permit of relative movement between these parts, a scale over which said index lever moves and carried by said support, means for locking one of said abutments relatively to said supporting and guiding means, means for transmitting movements of the other abutment to said index lever, and means for locking said supporting and guiding means relatively to said support.

3. An instrument or gauge for directly measuring the percentage variations in the gauge lengths of test pieces comprising a pair of movable abutments for engaging the ends of a test piece, supporting and guiding means for supporting and guiding the abutments for independent movement in the same straight line, a pivoted index lever, a support for said index lever connected to said supporting and guiding means in such manner as to permit of relative movement between these parts, a scale over which said index lever moves and carried by said support, means for locking one of said abutments relatively to said supporting and guiding means, means for transmitting movements of the other abutment to said index lever, a second scale carried by said support and an index carried by said supporting and guiding means for cooperating with said second scale whereby the position of said supporting and guiding means relative to said support may be adjusted in accordance with the gauge length of the test piece.

4. An instrument or gauge for measuring relative or percentage variations in the gauge lengths of test pieces comprising a channel member for carrying the test piece, two abutments mounted for independent movement along the channel member for engaging the ends of a test piece, a slide, a saddle carrying the channel member and mounted on the slide for movement along it at right angles to the channel, a lateral extension on the slide, an index lever pivoted to said extension, means for locking one of said abutments in any desired position along said channel member, means connected to the other of said abutments for engaging the index lever whereby movements of said abutment in one direction are transmitted to the index lever whilst permitting the point of engagement of the said other abutment with said index lever to be varied, and an arcuate scale carried by said slide for cooperating with said index lever.

5. An instrument or gauge for measuring relative or percentage variations in the gauge lengths of test pieces comprising a channel member for carrying the test piece, two abutments mounted for independent movement along said channel member for engaging the ends of a test piece, a slide graduated for different gauge lengths, a saddle moving along said slide, the said saddle carrying the channel member at right angles to the slide, a lateral extension at one end of said slide, an index lever pivoted at the end of said extension, a pair of pins carried by one of said abutments between which the index lever passes, a spring carried by one of said pins for keeping the index lever in engagement with the other pin, a graduated scale carried by the other end of the slide, the said scale being graduated to give percentage variations of gauge length, the said index lever moving over said scale, and means for locking the other of said abutments in any position along the channel member.

6. An instrument or gauge for measuring relative or percentage variations in the gauge lengths of test pieces comprising a channel member for carrying the test piece, two abutments mounted for independent movement along said channel member for engaging the ends of a test piece, a slide graduated for different gauge lengths, a saddle moving along said slide, the said saddle carrying the channel member at right angles to the slide, a lateral extension at one end of said slide, an index lever pivoted at the end of said extension, a pair of pins carried by one of said abutments between which the index lever passes, a spring carried by one of said pins for keeping the index lever in engagement with the other pin, a graduated scale carried by the other end of the slide, the said scale being graduated to give percentage variations of gauge length, the said index lever moving over said scale, means for locking the other of said abutments in any position along the channel member and means for locking the saddle in any desired position along the slide.

7. An instrument or gauge for measuring relative or percentage variations in the gauge lengths of test pieces comprising a pair of movable abutments for engaging the ends of a test piece, supporting and guiding means for supporting and guiding the abutments for independent movement in the same straight line, a pivoted index lever, a support to which said index lever is pivoted, a scale carried by said support over which said index lever moves, means for locking one of said abutments relatively to said supporting and guiding means, said other abutment engaging with said index lever intermediate its ends, said supporting and guiding means having sliding engagement wth said support whereby the distance of the point of engagement of the abutment with the lever from the pivot point of the lever may be varied according to the initial gauge length of the test piece.

8. An instrument or gauge for measuring relative or percentage variations in the gauge lengths of test pieces comprising a pair of movable abutments for engaging the ends of a test piece, supporting and guiding means for supporting and guiding the abutments for independent movement in the same straight line, a pivoted index lever, a support to which said index lever is pivoted, a scale carried by said support over which said index lever moves, means for locking one of said abutments relatively to said supporting and guiding means, said other abutment engaging with said index lever intermediate its ends, a second scale carried by said support and an index carried by said supporting and guiding means cooperating with said scale, said supporting and guiding means having sliding engagement with said support whereby the distance of the point of engagement of the abutment with the lever from the pivot point of the lever may be varied according to the initial gauge length of the test piece.

9. An instrument for directly measuring, without subsequent calculation the percentage variation in a portion, namely the gauge length of a test piece, comprising a carriage for holding the test piece, a pair of movable abutments carried by said carriage for engaging the ends of the test piece, means for locking one of said abutments relatively to the carriage, a support for said carriage in slidable relation thereto, a lever pivoted to said support, a graduated scale cooperating with the lever and carried by said support, the said support carrying said carriage so that the axis of the test piece can be set at a radius from the pivot point of the lever proportional to the gauge length of the test piece, and means for so connecting the other of said abutments to the lever that any increase in length of the test piece will cause the lever to be displaced over the scale in such manner that the reading on the scale will give the alteration in length as a percentage of the original gauge length directly without calculation.

LESLIE HAYWOOD HOUNSFIELD.